United States Patent
Song et al.

(10) Patent No.: US 11,387,441 B2
(45) Date of Patent: Jul. 12, 2022

(54) NEGATIVE ELECTRODE ACTIVE MATERIAL AND NEGATIVE ELECTRODE FOR SOLID STATE BATTERY INCLUDING THE SAME

(71) Applicant: LG Chem, Ltd., Seoul (KR)

(72) Inventors: Jun-Hyuk Song, Daejeon (KR); Eun-Kyung Kim, Daejeon (KR); Sang-Wook Woo, Daejeon (KR); Jung-Pil Lee, Daejeon (KR)

(73) Assignee: LG Energy Solution, Ltd.

( * ) Notice: Subject to any disclaimer, the term of this patent is extended or adjusted under 35 U.S.C. 154(b) by 217 days.

(21) Appl. No.: 16/613,153

(22) PCT Filed: Oct. 22, 2018

(86) PCT No.: PCT/KR2018/012510
§ 371 (c)(1),
(2) Date: Nov. 13, 2019

(87) PCT Pub. No.: WO2019/078702
PCT Pub. Date: Apr. 25, 2019

(65) Prior Publication Data
US 2020/0411843 A1     Dec. 31, 2020

(30) Foreign Application Priority Data
Oct. 20, 2017 (KR) .................. 10-2017-0136780

(51) Int. Cl.
*H01M 4/02* (2006.01)
*H01M 4/133* (2010.01)
(Continued)

(52) U.S. Cl.
CPC ....... *H01M 4/133* (2013.01); *H01M 10/0562* (2013.01); *H01M 10/0565* (2013.01); *H01M 2004/027* (2013.01)

(58) Field of Classification Search
CPC ............ H01M 4/133; H01M 10/0562; H01M 10/0565; H01M 2004/027
See application file for complete search history.

(56) References Cited

U.S. PATENT DOCUMENTS

| 6,156,432 A | 12/2000 | Mabuchi et al. |
|---|---|---|
| 2011/0195308 A1 | 8/2011 | Lee et al. |

(Continued)

FOREIGN PATENT DOCUMENTS

| CN | 101986797 A | 3/2011 |
|---|---|---|
| CN | 102479949 A | 5/2012 |

(Continued)

OTHER PUBLICATIONS

International Search Report from Application No. PCT/KR2018/012510 dated Apr. 11, 2019, pp. 1-3.
(Continued)

*Primary Examiner* — Jane J Rhee
(74) *Attorney, Agent, or Firm* — Lerner, David, Littenberg, Krumholz & Mentlik, LLP (57) ABSTRACT

Provided is a solid state battery which solves the problems of the conventional solid state battery, and is effectively inhibited from a dimensional change caused by charging/discharging, an increase in internal resistance and degradation of charging/discharging characteristics or cycle life at a high current. The solid state battery is provided with an electrode active material layer including a negative electrode active material, a solid electrolyte and a conductive material, wherein the negative electrode active material includes a carbonaceous material and the carbonaceous material includes a plurality of pores, a porosity of 10-60 vol %, and a pore size of 100-300 nm based on the largest diameter of the pores.

13 Claims, 6 Drawing Sheets

(51) Int. Cl.
H01M 10/0562 (2010.01)
H01M 10/0565 (2010.01)

(56) References Cited

U.S. PATENT DOCUMENTS

| | | |
|---|---|---|
| 2012/0077087 A1 | 3/2012 | Cho et al. |
| 2013/0252031 A1 | 9/2013 | Ma et al. |
| 2016/0156031 A1 | 6/2016 | Kim et al. |
| 2016/0351973 A1 | 12/2016 | Albano et al. |
| 2017/0129780 A1 | 5/2017 | Mihara et al. |
| 2017/0141380 A1 | 5/2017 | Aoki et al. |
| 2017/0271651 A1 | 9/2017 | Behan et al. |
| 2017/0309902 A1 | 10/2017 | Jo et al. |
| 2018/0287142 A1* | 10/2018 | Zhamu ................. H01M 4/386 |
| 2019/0088936 A1 | 3/2019 | Hong et al. |

FOREIGN PATENT DOCUMENTS

| | | |
|---|---|---|
| CN | 104103820 A | 10/2014 |
| EP | 2450988 A1 | 5/2012 |
| JP | 10036108 A | 2/1998 |
| JP | H117942 A | 1/1999 |
| JP | 2012523674 A | 10/2012 |
| JP | 2014143151 A | 8/2014 |
| JP | 201745593 A | 3/2017 |
| JP | 2017054720 A | 3/2017 |
| KR | 20110092544 A | 8/2011 |
| KR | 20150059935 A | 6/2015 |
| KR | 20150071249 A | 6/2015 |
| KR | 20160040103 A | 4/2016 |
| KR | 20160057255 A | 5/2016 |
| KR | 20160065028 A | 6/2016 |
| KR | 20170090449 A | 8/2017 |
| WO | 2015152214 A1 | 10/2015 |

OTHER PUBLICATIONS

"A Basic Guide to Particle Characterization". Malvern Instruments Worldwide—White Paper. May 2, 2012 (May 2, 2012). pages 1-26. XP055089322. Retrieved from the Internet: URL:http:jjgolik.co.il/Data/ABasicGuidtoParticleCharacterization(2)_1962085150.pdf [retrieved on Oct. 12, 2020].

Extended European Search Report including Written Opinion for EP18868331.2 dated Oct. 22, 2020; 9 pages.

Search Report dated Jan. 18, 2022 from the Office Action for Chinese Application No. 201880033598.0 dated Jan. 26, 2022, 3 pages.

\* cited by examiner

NEGATIVE ELECTRODE ACTIVE MATERIAL AND NEGATIVE ELECTRODE FOR SOLID STATE BATTERY INCLUDING THE SAME

CROSS-REFERENCE TO RELATED APPLICATIONS

The present application is a national phase entry under 35 U.S.C. § 371 of International Application No. PCT/KR2018/012510 filed Oct. 22, 2018, which claims priority from Korean Patent Application No. 10-2017-0136780 filed Oct. 20, 2017, all of which are incorporated herein by reference.

TECHNICAL FIELD

The present disclosure relates to a negative electrode for a solid state battery using a solid electrolyte as an electrolyte, and a negative electrode active material contained in the negative electrode.

BACKGROUND ART

Recently, as portable instruments, such as personal computers and cellular phones, have been distributed rapidly, secondary batteries as power sources for the portable instruments have been increasingly in demand Particularly, a lithium secondary battery has been given many attentions as a secondary battery capable of realizing high voltage with a low weight, and thus has been developed and commercialized actively. Among such lithium secondary batteries, a battery using a liquid electrolyte including a lithium salt dissolved in an organic solvent has been already commercialized as a power source for portable instruments, and a battery using a gel polymer electrolyte has been partially commercialized. In addition, active research and development have been conducted about a lithium secondary battery using a lithium ion conductive inorganic solid electrolyte or polymer solid electrolyte to provide a battery having no concern about leakage and capable of downsizing and thinning.

In general, the negative electrode active material for a lithium secondary battery is swelled or shrunk during charging/discharging. For example, an alloy-based negative electrode using a typical negative electrode active material, such as Si or Sn alloy, shows significant volumetric swelling up to 300% during charging.

Therefore, in the case of a lithium secondary battery, there is a problem related with commercialization due to a change in dimension of a battery, particularly, swelling of an electrode. In addition, when a positive electrode and negative electrode repeatedly undergo swelling and shrinking during charging/discharging cycles, the contact strength among the ingredients, such as active material particles, conductive material particles and electrolyte, in an electrode is decreased, resulting in degradation of a conductive network. This causes some problems, including degradation of charging/discharging characteristics and deterioration of capacity after repeating charging/discharging cycles. In addition, such swelling and shrinking of an electrode make the contact between an electrode and a battery casing unstable, thereby causing an increase in the internal resistance of the battery.

Particularly, in the case of a solid state lithium secondary battery including a lithium ion conductive solid electrolyte in an electrode, the contact between hard solid electrolyte particles and active material particles may be easily broken due to the swelling and shrinking of an electrode during charging/discharging. Therefore, a lithium ion supplying or discharging path into or from an active material is interrupted, and thus charging/discharging characteristics are degraded significantly.

To solve the above-mentioned problems, a solid state lithium secondary battery including electrode active material particles surface-coated with a lithium ion conductive polymer has been suggested (Japanese Laid-Open Patent No. 11-7942). The solid state lithium secondary battery is directed to inhibiting release of binding among particles and a change in volume of a battery caused by swelling and shrinking of an electrode active material during charging/discharging, by virtue of the elastic property of the polymer. However, as described in Examples thereof, the surface of active material particles coated totally with a polymer layer has no pores through which the polymer compressed and deformed upon the swelling of the active material is introduced, and thus swelling of the active material directly affects swelling of the electrode. As a result, there is an insufficient effect of inhibiting swelling of an electrode. In addition, since the surface of the active material particles is coated totally with the polymer layer, an electron conductive network among the active material particles is insufficient, resulting in degradation of high-rate charging/discharging characteristics undesirably.

DISCLOSURE

Technical Problem

The present disclosure is designed to solve the problems of solid state battery according to the related art, and therefore the present disclosure is directed to providing a solid state battery which is effectively inhibited from a dimensional change caused by charging/discharging, an increase in internal resistance and degradation of charging/discharging characteristics or cycle life at a high current. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a novel negative electrode active material capable of solving the above-mentioned technical problem, and an electrochemical device including the same.

According to the first embodiment of the present disclosure, there is provided a negative electrode active material which includes a core portion including a carbonaceous material and a shell portion at least partially coated on the surface of the core portion, wherein the carbonaceous material includes a plurality of pores, a porosity of 5-30 vol %, and a pore size of 100-300 nm based on the largest diameter of the pores.

According to the second embodiment of the present disclosure, there is provided the negative electrode active material as defined in the first embodiment, wherein the carbonaceous material is a porous material and is at least one selected from soft carbon, hard carbon, natural graphite, kish graphite, pyrolytic carbon, mesophase pitch based carbon fibers, mesocarbon microbeads, mesophase pitches, petroleum or coal tar pitch derived cokes and activated carbon.

According to the third embodiment of the present disclosure, there is provided the negative electrode active material as defined in the first or the second embodiment, wherein the carbonaceous material is at least one selected from graphite primary particles, graphite secondary particles formed by aggregation of a plurality of graphite primary particles, and porous activated carbon.

According to the fourth embodiment of the present disclosure, there is provided the negative electrode active material as defined in any one of the first to the third embodiments, wherein the pore includes at least one selected from an open pore by which the inner part and the outer part of the active material are interconnected, and a closed pore.

According to the fifth embodiment of the present disclosure, there is provided the negative electrode active material as defined in any one of the first to the fourth embodiments, wherein the core portion has a diameter ($D_{50}$) of 5-20 μm.

According to the sixth embodiment of the present disclosure, there is provided the negative electrode active material as defined in any one of the first to the fifth embodiments, wherein the sectional area of the pores in the sectional area of the cores of a portion of 50%±20% based on the largest diameter is 10-50% based on 100% of the sectional area of the cores.

According to the seventh embodiment of the present disclosure, there is provided the negative electrode active material as defined in any one of the first to the sixth embodiments, wherein the shell portion has a thickness of 100 nm to 5 μm and covers 80% or more of the surface area of the core portion.

According to the eighth embodiment of the present disclosure, there is provided the negative electrode active material as defined in any one of the first to the seventh embodiments, wherein the shell portion includes a metal oxide, and the metal oxide is at least one selected from the group consisting of lithium titanium oxide, iron oxides, titanium oxide, aluminum oxide, chromium trioxide, zinc oxide, copper oxides, magnesium oxide, zirconium dioxide, molybdenum trioxide, vanadium pentoxide, niobium pentoxide, iron oxide, manganese oxide, vanadium oxide, cobalt oxide, nickel oxide and tantalum pentoxide.

In another aspect, there is provided a negative electrode for a solid state battery which includes the negative electrode active material.

According to the ninth embodiment of the present disclosure, there is provided a negative electrode which includes an electrode active material layer including a negative electrode active material, a solid electrolyte and a conductive material, wherein the negative electrode active material is defined in any one of the first to the eighth embodiments.

According to the tenth embodiment of the present disclosure, there is provided the negative electrode as defined in the ninth embodiment, which includes, as a solid electrolyte, at least one of a polymer electrolyte and an inorganic solid electrolyte.

In still another aspect, there is provided a solid state battery including the negative electrode. According to the eleventh embodiment of the present disclosure, there is provided a solid state battery which includes a negative electrode, a positive electrode and a solid electrolyte membrane interposed between the negative electrode and the positive electrode, wherein the negative electrode is defined in the ninth or the tenth embodiment.

Advantageous Effects

The negative electrode active material particles according to the present disclosure are inhibited from volumetric swelling. Therefore, the conductive network among the ingredients, including active material particles, conductive material particles and an electrolyte, of an electrode is retained during charging/discharging of a battery. As a result, the solid state battery using the electrode according to the present disclosure shows excellent cycle characteristics and a low increment in internal resistance.

DESCRIPTION OF DRAWINGS

DESCRIPTION OF DRAWING NUMERALS

10: Solid electrolyte
20: Negative electrode active material
30: Pores

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected electrically to another portion' by way of the other element interposed between them.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a negative electrode active material and a negative electrode for a solid state battery including the same. The negative electrode includes a current collector and a negative electrode active material layer formed on the surface of the current collector. The negative electrode active material layer includes a negative electrode active material, a solid electrolyte and a conductive material. In addition, the negative electrode is characterized in that it shows a change in volume of 20% or less, or 10% or less, after charging/discharging. According to the present disclosure, the change in volume is calculated by the following Formula 1:

Change in volume (%)=[(Volume of negative electrode after deformation−Volume of negative electrode before deformation)/(Volume of negative electrode before deformation)]×100    [Formula 1]

The negative electrode active material and negative electrode according to the present disclosure show a small change in volume during charging/discharging, and thus maintain a conductive network stably. In addition, a solid state battery using the negative electrode has excellent cycle characteristics and a low increment in internal resistance. According to the present disclosure, the conductive network covers both an ion conductive network and an electron conductive network.

Figure 1:
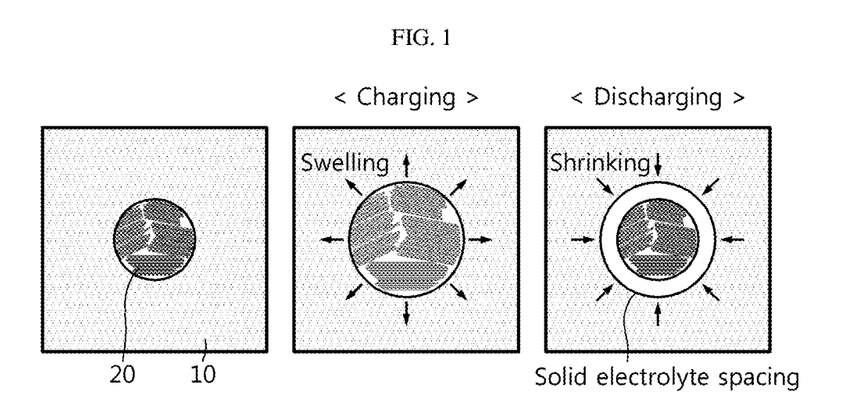
FIG. 1 is a schematic view illustrating the negative electrode of a conventional solid state battery.
Figure 2:
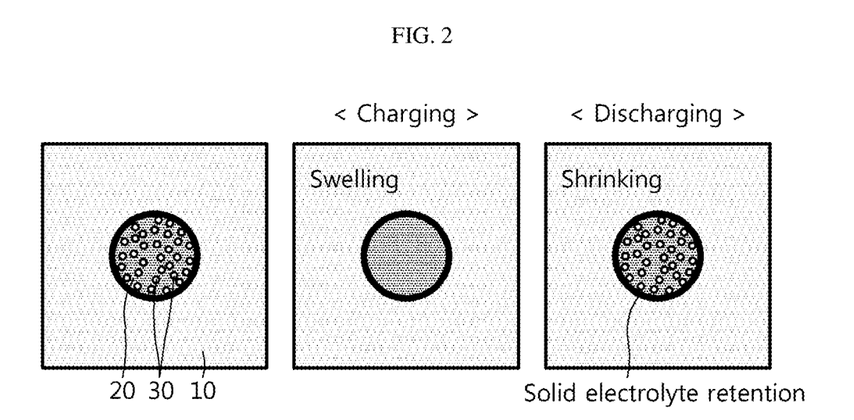
FIG. 2 is a schematic view illustrating the negative electrode according to the present disclosure.

A negative electrode active material, such as a carbonaceous material shows a change in volume due to lithium intercalation and deintercalation during charging and discharging of a battery. FIG. 1 is a schematic view illustrating a rupture of a conductive network occurring in the conventional solid state battery. In the case of an electrode for a solid state battery including electrode active material particles 20 surrounded with a solid electrolyte 10, the electrode active material particles 20 are spaced apart from the solid electrolyte 10 when the electrode active material 20 is shrunk after its volumetric swelling to cause a rupture of a conductive network, such as an electron and/or ion conduction path, resulting in an increase in resistance. As a result, as the number of cycles is increased, capacity maintenance may be decreased rapidly. Thus, the present disclosure provides a negative electrode active material having a uniform pore size and uniform pore distribution inside the negative electrode active material. FIG. 2 is a schematic view illustrating prevention of a rupture of a conductive network with an electrolyte 10 even after repeating charging/discharging by virtue of inhibition of outward volumetric swelling in the negative electrode active material 20 according to the present disclosure. When the negative electrode active material 20 according to the present disclosure is used for a solid state battery, the pores 30 in the active material 20 absorb the volumetric swelling to reduce a volumetric swelling ratio of the active material particles. Therefore, even after the battery repeats charging/discharging, it is possible to maintain a conductive network well and to prevent degradation of cycle characteristics.

According to the present disclosure, the negative electrode active material includes a carbonaceous material, which includes a plurality of pores. The pores may be open pores with which the inner part of the active material and the outer part thereof are interconnected. In addition, the pores may be closed pores. According to an embodiment of the present disclosure, the active material may include open and/or closed pores. The open pores are interconnected with each other, and thus a fluid, such as gas or liquid, can pass through the open pores from one end to the other end.

In addition, according to an embodiment of the present disclosure, the negative electrode active material shows an isotropic volumetric change after charging/discharging, based on the total volume of the active material.

According to an embodiment of the present disclosure, the negative electrode active material may have a particle shape. The carbonaceous material includes particles, such as primary particles and/or secondary particles formed by aggregation of primary particles. The pores contained in the carbonaceous material may be pores of primary particles or pores derived from an interstitial volume formed between primary particles, between primary particles and secondary particles, or between secondary particles.

According to an embodiment of the present disclosure, the negative electrode active material has a change in volume of 20% or less, or 10% or less, after charging/discharging. Such a limited change in volume according to the present disclosure results from the above-defined porosity range and/or pore distribution. In addition, according to the present disclosure, such a change in volume may be accomplished more effectively from the negative electrode active material particles having a core-shell structure as described hereinafter.

According to the present disclosure, the carbonaceous material is capable of lithium ion intercalation/deintercalation, and non-limiting examples thereof include at least one selected from the group consisting of soft carbon, hard carbon, natural graphite, kish graphite, pyrolytic carbon, mesophase pitch based carbon fibers, mesocarbon microbeads, mesophase pitches, petroleum or coal tar pitch derived cokes and activated carbon.

According to an embodiment of the present disclosure, the carbonaceous material may include at least one selected from the group consisting of artificial graphite, natural graphite, soft carbon and hard carbon. For example, the carbonaceous material may include artificial graphite and/or natural graphite. In addition, the carbonaceous material may include at least one of free primary particles and secondary particles formed by aggregation of primary particles. The secondary particles may be prepared by various methods. According to an embodiment of the present disclosure, graphite particles classified into 500 nm to 5 μm are mixed with solid pitch so that they may be surface-coated and disintegrated into a level of 5 μm to 20 μm to obtain secondary particles. Then, the secondary particles may be heat treated at 3,000° C. or higher together with a graphitization catalyst to obtain carbon particles including pores with adequate effective pores. Herein, the content of graphitization catalyst and heat treatment temperature may be adjusted to control the particles to provide a desired porosity distribution.

According to an embodiment of the present disclosure, the carbonaceous material has a porosity of 5-30 vol %. Within the above-defined range, the porosity may be 5 vol % or more, 10 vol % or more, 15 vol % or more, or 20 vol % or more. In addition, the porosity may be 25 vol % or less, 20 vol % or less, or 15 vol % or less, within the above-defined range. The pore size may be 500 nm or less based on the largest sectional diameter of the pores. For example, the pores may have a sectional diameter of 100-300 nm based on the largest diameter. According to the present disclosure, the pore size may be set adequately so that a solid electrolyte may not infiltrate into the pores. For example, when using a particle-shaped inorganic solid electrolyte as an electrolyte, the pore size is preferably smaller than the particle diameter of the inorganic solid electrolyte particles.

According to an embodiment of the present disclosure, the porosity range and pore size may be realized by the negative electrode active material formed by aggregation of primary graphite particles as described hereinafter.

The porosity range of the carbonaceous material may be calculated as the porosity of the particles themselves through the integration of the areas of pores corresponding to the voids between particles in the particle diameter spectrum determined by the mercury porosimetry, or the like, to obtain the total volume of mercury. In addition, according to the present disclosure, in the carbonaceous material, the sectional area of the pores in the sectional area of a portion of 50%±20% based on the largest diameter is 10-50% based on 100% of the sectional area of the cores.

According to the present disclosure, the porosity and pore diameter may be determined by the BET 6-point method through nitrogen gas adsorption flowmetry using a scanning electron microscopic (SEM) image, a mercury porosimeter or porosimetry analyzer (Bell Japan Inc., Belsorp-II mini).

The primary particles of the negative electrode active material may have a particle diameter ($D_{50}$) of 500 nm to 5 μm. According to an embodiment of the present disclosure, the particle diameter ($D_{50}$) may be 500 nm or more, 700 nm or more, 1 μm or more, or 2 μm or more. In addition, the particle diameter ($D_{50}$) may be 5 μm or less, 4.5 μm or less, 4 μm or less, or 3 μm or less.

In addition, the secondary particles of the negative electrode active material may have a particle diameter ($D_{50}$) of 5-20 μm. According to an embodiment of the present disclosure, the particle diameter ($D_{50}$) may be 5 μm or more, 7 μm or more, or 10 μm or more. In addition, the particle diameter ($D_{50}$) may be 20 μm or less, 17 μm or less, or 15 μm or less.

When the particle diameter ($D_{50}$) of the primary particles and/or secondary particles according to the present disclosure satisfies the above-defined range, it is possible to prevent a decrease in density of an electrode, to provide an adequate capacity per volume, and to carry out coating of slurry for forming an electrode adequately to a uniform thickness.

The particle diameter ($D_{50}$) of the negative electrode active material means a particle diameter ($D_{50}$) corresponding to 50% of the accumulated value from smaller particles calculated based on the results of determining the particle size distribution of the particles after classification using a general particle size distribution analyzer. Such a particle size distribution may be determined by a diffraction or scattering intensity pattern through a particle size analyzer, such as Microtrac 9220FRA or Microtrac HRA available from the Nikkiso Company.

According to an embodiment of the present disclosure, the negative electrode active material particles may have a core-shell structure including a core surface-coated with a shell portion. According to another embodiment of the present disclosure, the core portion in the core-shell structure may include graphite particles and the above-mentioned carbonaceous materials may be used as graphite particles. According to still another embodiment of the present disclosure, the graphite particles forming core portion may include secondary particles formed by aggregation of primary particles whose surfaces are totally or at least partially coated with a shell portion. According to still another embodiment of the present disclosure, the graphite particles of the core portion may have a particle diameter ($D_{50}$) of 5 μm to 20 μm. The particle diameter may be controlled suitably considering the thickness of a shell portion, within the above-defined range.

According to an embodiment of the present disclosure, the shell portion has a thickness of 100 nm to 5 μm. The shell portion may have a thickness of 300 nm or more, 500 nm or more, or 1 μm or more, within the above-defined range. In addition, the thickness of the shell portion may be 4 μm or less, 3 μm or less, 2 μm or less, or 1 μm or less, within the above-defined range. In addition, the shell portion covers 80% or more of the area of the core portion.

The shell portion functions to inhibit volumetric swelling of the carbonaceous material as a core portion. The shell portion shows a low change in volume less than 10 vol %, preferably less than 5 vol %, and more preferably less than 1 vol %. The shell portion preferably has higher hardness as compared to the carbonaceous material used for the core portion. Since the shell portion covers the surface of the carbonaceous material, it is possible to inhibit outward volumetric swelling of the carbonaceous material. In addition, the shell portion helps the pores, i.e., internal vacant spaces of the carbonaceous material, to carry out a cushioning effect by absorbing such a volumetric change.

According to an embodiment of the present disclosure, the shell portion may have a thickness of 500 nm to 5 μm, particularly 700 nm to 3 μm, and more particularly 800 nm to 1 μm.

The shell portion may include at least one selected from the group consisting of non-graphitizable carbon and metal oxides. The metal oxide is not particularly limited but may be a transition metal oxide used as a negative electrode active material for a lithium secondary battery. For example, the metal oxide may be at least one selected from the group consisting of titanium oxide, aluminum oxide, chromium trioxide, zinc oxide, copper oxides, magnesium oxide, zirconium dioxide, molybdenum trioxide, vanadium pentoxide, niobium pentoxide, manganese oxide, vanadium oxide, iron oxides, manganese oxide, vanadium oxide, cobalt oxide, nickel oxide and tantalum pentoxide. Particularly, the metal oxide may be at least one selected from the group consisting of titanium oxide, iron oxides, cobalt oxide and nickel oxide.

According to an embodiment of the present disclosure, the shell portion may be formed through a drop coating process, chemical vapor deposition process, melt coating process, electrodynamic coating process, electrospraying process, electrospinning process, carbon-based coating process using a V-cone or a dip coating process. It is apparent to those skilled in the art that any process may be selected suitably from the above-mentioned processes to form the shell portion to a desired thickness.

According to an embodiment of the present disclosure, the shell portion may include a conductive material. Although the content of the conductive material is not particularly limited, the conductive material may be added in an adequate amount within a range of 0.1-10 wt % based on 100 wt % of the shell portion.

In another aspect, there is provided a negative electrode including the negative electrode active material layer containing the negative electrode active material.

The negative electrode may be obtained by mixing and agitating the negative electrode active material, a solid electrolyte, a conductive material and a solvent to form slurry, applying the slurry to a current collector, and carrying out pressing and drying to form a negative electrode active material layer on the current collector. If desired, the negative electrode may further include a polymer binder.

The negative electrode active material layer may have a porosity of 10-60 vol %, particularly 20-40 vol %, and more particularly 25-35 vol %.

In general, the negative electrode current collector is formed to have a thickness of 3-500 μm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; copper or stainless steel surface-treated with carbon, nickel, titanium or silver; aluminum-cadmium alloy; or the like. It is possible to increase the adhesion of the negative electrode active material by forming fine surface irregularities on the surface of the current collector, similarly to the positive electrode current collector. The negative electrode current collector may have various shapes, such as a film, sheet, foil, net, porous body, foam and a non-woven web body.

According to the present disclosure, the solid electrolyte has lithium ion conductivity and may include various inorganic solid electrolytes and/or polymer electrolytes with no particular limitation. The solid electrolyte may have an ion conductivity of $10^{-6}$ S/cm or more but is not limited thereto.

According to an embodiment of the present disclosure, the inorganic solid electrolyte is not particularly limited, and may include at least one of inorganic solid electrolytes, such as a crystalline solid electrolyte, non-crystalline solid electrolyte or glass ceramic solid electrolyte. The solid electrolyte may include a sulfide-based solid electrolyte and examples thereof may include lithium sulfide, silicon sulfide, germanium sulfide and boron sulfide. Particular examples of the inorganic solid electrolyte may include $Li_{3.833}Sn_{0.833}As_{0.166}S_4$, $Li_4SnS_4$, $Li_{3.25}Ge_{0.25}P_{0.75}S_4$, $Li_2S-P_2S_0$, $B_2S_3-Li_2S$, $XLi_2S-(100-x)P_2S_5$ (x=70-80), $Li_2S-SiS_2-Li_3N$, $Li_2S-P_2S_5-LiI$, $Li_2S-SiS_2-LiI$, $Li_2S-B_2S_3-LiI$, $Li_3N$, LISICON, LIPON ($Li_{3+y}PO_{4-x}N_x$), thio-LISICON ($Li_{3.25}Ge_{0.25}P_{0.75}S_4$), $Li_2O-Al_2O_3-TiO_2-P_2O_5$ (LATP), or the like.

According to an embodiment of the present disclosure, the polymer electrolyte is a composite of dissociated lithium salt with polymer resin and has lithium ion conductivity. Particular examples of the polymer resin may include a polyether polymer, polycarbonate polymer, acrylate polymer, polysiloxane polymer, phosphazene polymer, polyethylene derivative, alkylene oxide derivative, such as polyethylene oxide, phosphate polymer, polyagitation lysine, polyester sulfide, polyvinyl alcohol, polyvinylidene fluoride, polymer containing an ionically dissociatable group, or the like. According to an embodiment of the present disclosure, the solid polymer electrolyte may include a polymer resin, such as a branched copolymer including polyethylene oxide (PEO) backbone copolymerized with a comonomer including an amorphous polymer, such as PMMA, polycarbonate, polydiloxane (pdms) and/or phosphazene, comb-like polymer, crosslinked polymer resin, or the like.

The lithium salt may be one used conventionally for an electrolyte for a lithium secondary battery with no particular limitation. For example, the lithium salt may include $Li^+$ as cation, and as anion, at least one selected from the group consisting of $F^-$, $Cl^-$, $Br^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH$, $CF_3(CF_2)_7SO_3^-$, $CF_3CO_2^-$, $CH_3CO_2^-$, $SCN^-$ and $(CF_3CF_2SO_2)_2N^-$. Such lithium salts may be used alone or in combination, as necessary.

The binder and conductive material used for the negative electrode may be those used conventionally in the art.

The conductive material is not particularly limited, as long as it has conductivity while not causing any chemical change in the corresponding battery. Particular examples of the conductive material include any one selected from: graphite, such as natural graphite or artificial graphite; carbon black, such as acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive metal oxides, such as titanium oxide; conductive materials, such as polyphenylene derivatives; or the like.

According to the present disclosure, the binder resin is not particularly limited, as long as it is an ingredient which assists the binding of an active material with a conductive material, or the like, and the binding to a collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder resin is added in an amount of 1-30 wt % or 1-10 wt %, based on the total weight of the electrode layer.

The solvent for forming the negative electrode may include at least one selected from water and organic solvents, such as N-methyl pyrrolidone (NMP), dimethyl formamide (DMF), acetone, dimethyl acetamide, or the like. Such solvents may be used alone or in combination. The solvent may be used in an amount sufficient to dissolve and disperse the electrode ingredients, such as the active material, considering the slurry coating thickness, production yield, or the like.

According to an embodiment of the present disclosure, the negative electrode may further include a thickening agent to control the viscosity. The thickening agent may be a cellulose-based compound and particular examples thereof include at least one selected from the group consisting of carboxymethyl cellulose (CMC), hydroxymethyl cellulose, hydroxyethyl cellulose and hydroxypropyl cellulose, particularly carboxymethyl cellulose (CMC). The negative electrode active material and the binder may be dispersed into water together with the thickening agent and then the resultant dispersion may be applied to the negative electrode.

In still another aspect, there is provided a lithium secondary battery including the negative electrode. The lithium secondary battery includes a negative electrode, a positive electrode and a solid electrolyte membrane interposed between the negative electrode and the positive electrode, wherein the negative electrode is defined in the present disclosure.

The positive electrode may be obtained by the conventional method known to those skilled in the art. For example, a positive electrode active material is mixed and agitated with a solvent, and optionally a binder, conductive material and a dispersing agent to form slurry. Then, the slurry is applied (coated) onto a metallic current collector, followed by pressing and drying, to obtain a positive electrode.

The metallic current collector includes a highly conductive metal. The metal is not particularly limited as long as it allows easy adhesion of the slurry of the positive electrode active material and has high conductivity, while not causing any chemical change in the corresponding battery in the voltage range of the battery. Particular examples of the metallic current collector include stainless steel; aluminum; nickel; titanium; baked carbon; copper or stainless steel surface-treated with carbon, nickel, titanium or silver; or the like. It is possible to increase the adhesion of the positive electrode active material by forming fine surface irregularities on the surface of the current collector. The current collector may have various shapes, such as a film, sheet, foil, net, porous body, foam and a non-woven web body, and may have a thickness of 3-500 μm.

In the method for manufacturing the lithium secondary battery according to the present disclosure, particular examples the positive electrode active material may include, but are not limited to: layered compounds such as lithium cobalt oxide ($LiCoO_2$), lithium nickel oxide ($LiNiO_2$), $Li[Ni_aCo_bMn_cM^1_d]O_2$ (wherein $M^1$ is any one element elected from the group consisting of Al, Ga and In, or a combination of two or more of them, $0.3 \leq a < 1.0$, $0 \leq b \leq 0.5$, $0 \leq c \leq 0.5$, $0 \leq d \leq 0.1$, and $a+b+c+d=1$), $Li(Li_eM^2_{f-e-f}M^3_f)O_{2-g}A_g$ (wherein $0 \leq e \leq 0.2$, $0.6 \leq f \leq 1$, $0 \leq f' \leq 0.2$, $0 \leq g \leq 0.2$, $M^2$ includes Mn and at least one selected from the group consisting of Ni, Co, Fe, Cr, V, Cu, Zn and Ti, $M^3$ is at least one selected from the group consisting of Al, Mg and B, and A is at least one selected from the group consisting of P, F, S and N), or those compounds substituted with one or more transition metals; lithium manganese oxides such as those represented by the chemical formula of $Li^{1+h}Mn_{2-h}O_4$ (wherein $0 \leq h \leq 0.33$), $LiMnO_3$, $LiMn_2O_3$, $LiMnO_2$, or the like; lithium copper oxide ($Li_2CuO_2$); vanadium oxides such as $LiV_3O_8$, $V_2O_5$ or $Cu_2V_2O_7$; Ni-site type lithium nickel oxides represented by the chemical formula of $LiNi_{1-i}M^4_iO_2$ (wherein $M^4$=Co, Mn, Al, Cu, Fe, Mg, B or Ga, and $0.01 \leq y \leq 0.3$); lithium manganese composite oxides represented by the chemical formula of $LiMn_{2-j}M^5_jO_2$ (wherein $M^5$=Co, Ni, Fe, Cr, Zn or Ta, and $0.01 \leq y \leq 0.1$) or $Li_2Mn_3M^6O_8$ (wherein $M^6$=Fe, Co, Ni, Cu or Zn); $LiMn_2O_4$ in which Li is partially substituted with an alkaline earth metal ion; disulfide compounds; $LiFe_3O_4$, $Fe_2(MoO_4)_3$; or the like.

The solvent for forming the positive electrode may include at least one selected from water and organic solvents, such as N-methyl pyrrolidone (NMP), dimethyl formamide (DMF), acetone, dimethyl acetamide, or the like. Such solvents may be used alone or in combination. The solvent may be used in an amount sufficient to dissolve and disperse the electrode ingredients, such as the positive electrode active material, binder and conductive material, considering the slurry coating thickness, production yield, or the like.

Particular examples of the binder may include various types of binder polymers, such as polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, and polymers thereof whose hydrogen atoms are substituted with Li, Na or Ca, or various copolymers.

The conductive material is not particularly limited, as long as it has conductivity while not causing any chemical change in the corresponding battery. Particular examples of the conductive material include any one selected from: graphite, such as natural graphite or artificial graphite; carbon black, such as acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive metal oxides, such as titanium oxide; conductive materials, such as polyphenylene derivatives; or the like.

The dispersing agent that may be used includes an aqueous dispersing agent or an organic dispersing agent, such as N-methyl-2-pyrrolidone.

In addition, the solid state battery according to the present disclosure is provided with a solid electrolyte membrane between the positive electrode and the negative electrode. The solid electrolyte membrane is interposed between the negative electrode and the positive electrode and functions to electrically insulate the negative electrode and the positive electrode from each other, while allowing lithium ions to pass therethrough. In general, the solid electrolyte membrane may be any one used conventionally in the field of solid state batteries and is not particularly limited. According to an embodiment of the present disclosure, the solid electrolyte membrane may be prepared in the form of a film or membrane, and may include at least one of the above-described electrolyte ingredients.

There is no particular limitation in the outer shape of the solid state battery according to the present disclosure. The solid state battery may be a cylindrical, prismatic, pouch-type or a coin-type battery.

The solid state battery according to the present disclosure may be used not only for a battery cell used as a power source of compact devices but also for a unit cell of a medium- to large-size battery module including a plurality of battery cells.

Mode for Disclosure

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example (1) Preparation of Negative Electrode Active Material (Core-Shell Structure)

Scaly natural graphite was pulverized and classified to obtain primary particles having a particle size of about 2 μm, and the primary particles were mixed with solid phase pitch so that they were surface-coated and formed secondary particles. Next, heat treatment was carried out under Ar atmosphere at 3,000° C. to obtain graphite particles (secondary particles) having a particle size of about 15 μm. Then, chemical vapor deposition was carried out to perform surface coating of the graphite particles with $TiO_2$ to a thickness of 800 nm.

Figure 3A:
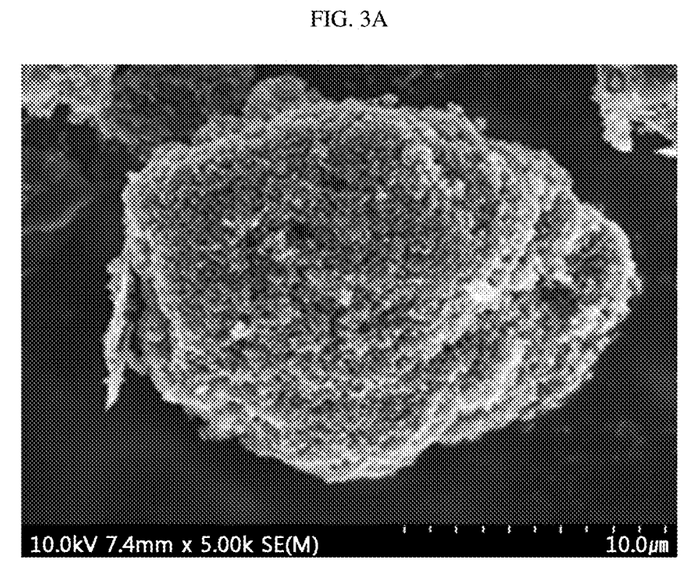
FIG. 3A and FIG. 3B are scanning electron microscopic (SEM) images of the electrode active material particles according to Example of the present disclosure.
Figure 3B:
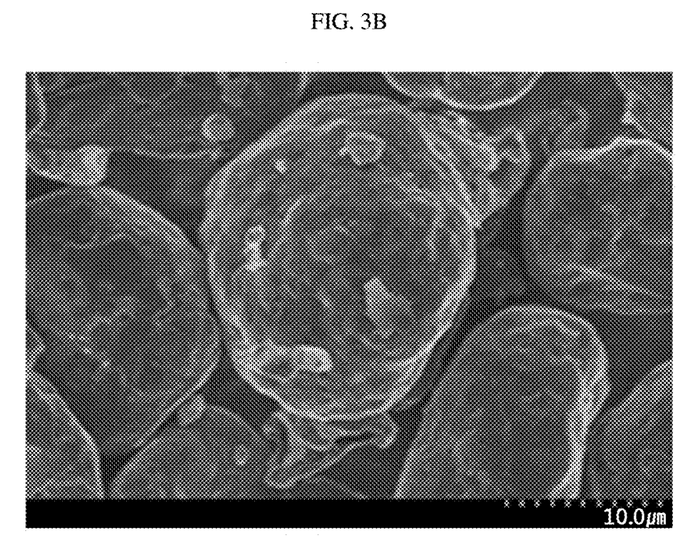

FIG. 3A is a scanning electron microscopic (SEM) image of the resultant graphite particles. It can be seen from FIG. 3A that a plurality of primary particles is aggregated to form secondary particles. In addition, FIG. 3B is an enlarged view of FIG. 3A and shows primary particles forming secondary particles.

Figure 4A:
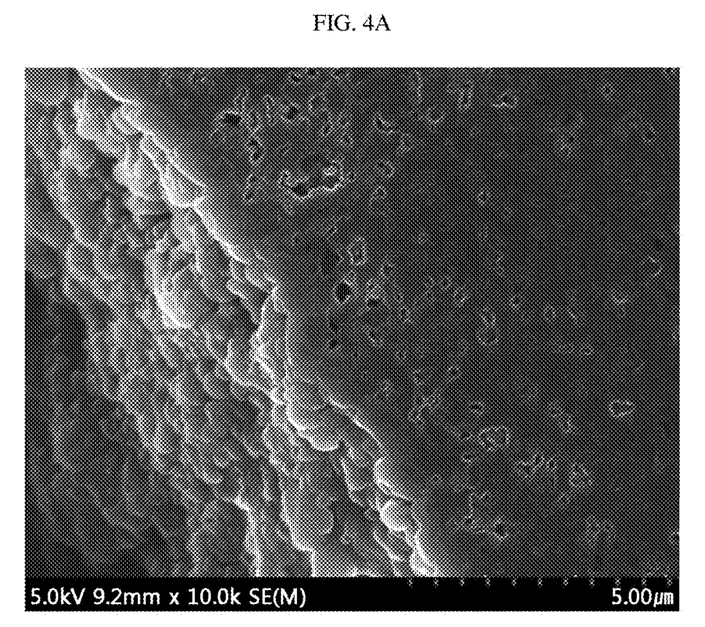
FIG. 4A and FIG. 4B are SEM images illustrating the section of the electrode active material particles according to Example of the present disclosure.
Figure 4B:
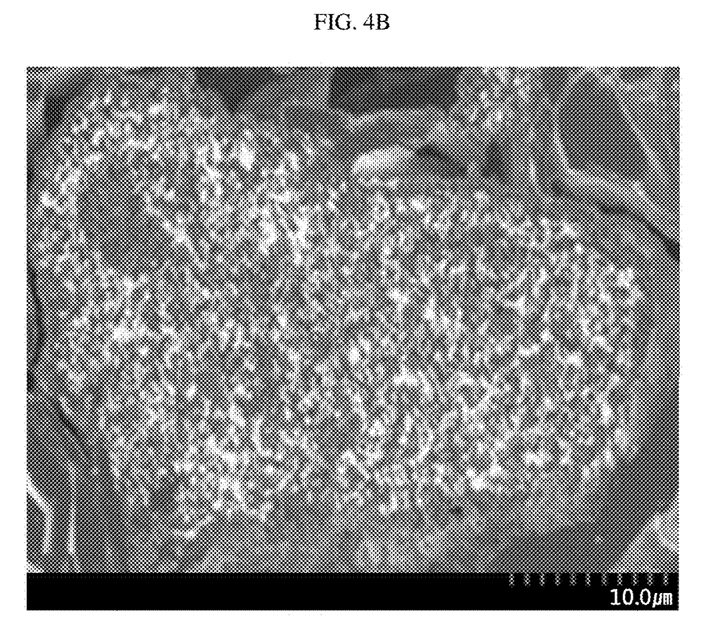

Then, a shell portion was formed as described hereinafter. The secondary particles were introduced to a Quartz tubular reactor and warmed to about 500° C. under $N_2$ atmosphere and cooled to 200° C., and the temperature was maintained. After that, $TiCl_4$ was allowed to flow through the reactor under $N_2$ atmosphere for about 10 hours. Then, water vapor was allowed to flow for about 2 hours to carry out hydrolysis. After that, the temperature was maintained while supplying $O_2$, and sintering was carried out for 2 hours to obtain graphite particles on which $TiO_2$ was formed to a thickness of 800 nm. The graphite particles had a porosity of about 25%. FIG. 4A and FIG. 4B are SEM images illustrating the section of the core-shell particles. Particularly, it can be seen from FIG. 4B that the pores have a constant diameter in the section and are distributed homogeneously over the whole section. By virtue of such structural characteristics, the negative electrode active material according to this Example causes isotropical volumetric swelling in all directions and shows a small change in volume.

(2) Manufacture of Negative Electrode

Polyethylene oxide (PEO) was mixed with LiTFSI at a molar ratio of [EO]:[Li$^+$]=18:1, and the mixture was agitated in acetonitrile (AN) at 60° C. for one day. Then, the negative electrode active material obtained from the above Preparation Example was dipped in the solution, followed by drying, to obtain a negative electrode for a solid state battery. The resultant negative electrode had a porosity of 28%.

(3) Manufacture of Battery

Then, polyethylene oxide (PEO) was mixed with LiTFSI at a molar ratio of [EO]:[Li$^+$]=18:1, and the mixture was agitated in acetonitrile (AN) at 60° C. for one day. Next, Li[Ni$_{0.8}$Mn$_{0.1}$Co$_{0.1}$]O$_2$ as a positive electrode active material was dipped in the solution, followed by drying, to obtain a positive electrode for a solid state battery. The resultant positive electrode had a porosity of 28%.

Meanwhile, polyethylene oxide (PEO) was mixed with LiTFSI at a molar ratio of [EO]:[Li$^+$]=18:1, and the mixture was agitated in acetonitrile (AN) at 60° C. for one day. The solution was cast onto a PET film, followed by drying, to form a solid electrolyte layer.

The negative electrode layer, separator and the positive electrode layer were stacked successively to obtain an electrode assembly, which, in turn, was sealed in a pouch to provide a battery.

Comparative Examples

Comparative Example 1

Figure 5A:
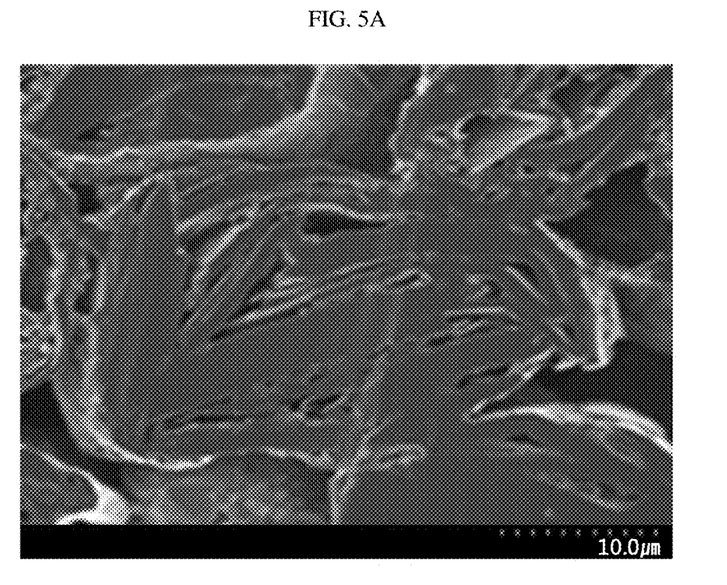
FIG. 5A and FIG. 5B are SEM images illustrating the section of the electrode active material particles according to Comparative Examples.
Figure 5B:
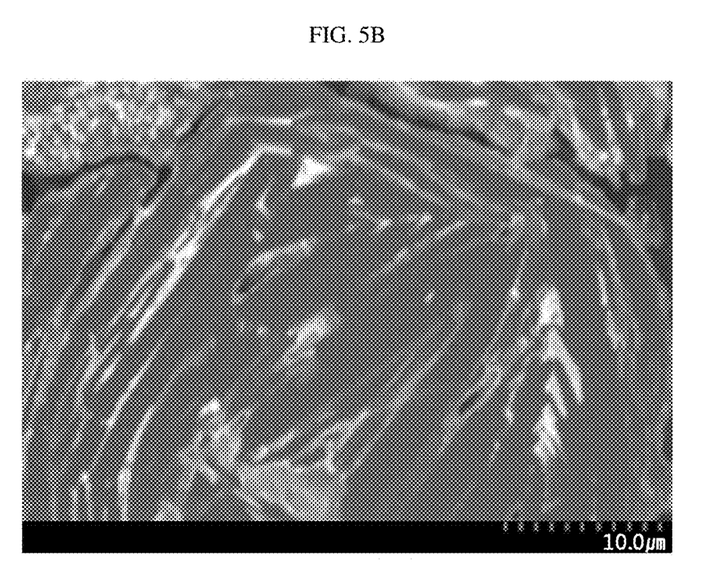
Figure 5C:
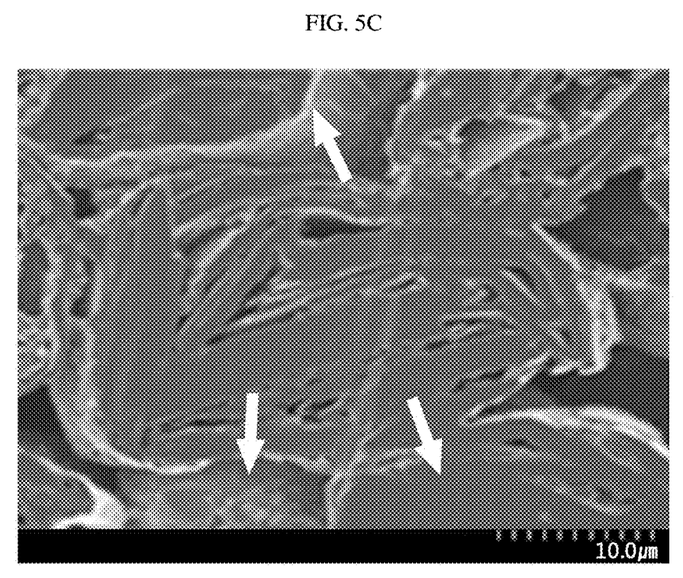
FIG. 5C and FIG. 5D show a direction of swelling of the electrode active material particles according to Comparative Examples.
Figure 5D:
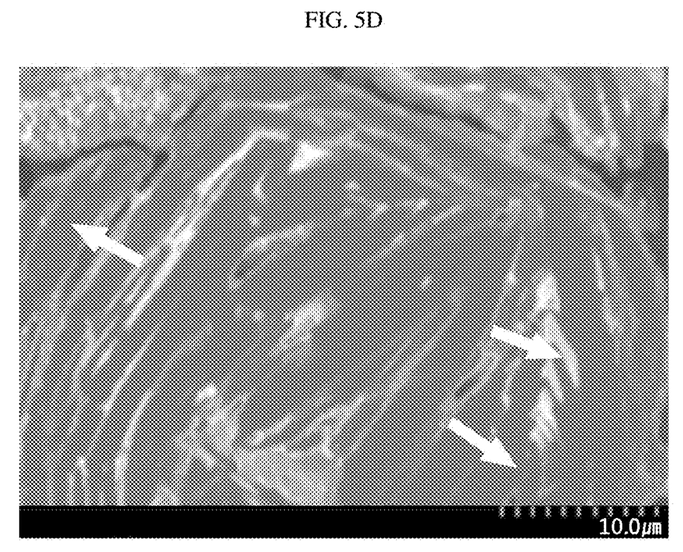

An electrode was prepared in the same way as in Example 1, except that 15 μm graphite obtained by spheroidization of scaly natural graphite was used as a core. FIG. 5A and FIG. 5B illustrate the section of scaly natural graphite used in Comparative Example 1. It can be seen that the pores have a needle-like or rectangular shape, show a significantly large aspect ratio and are present locally at a part of the particle section. The negative electrode active material particles having such a pore shape and arrangement tend to show volumetric swelling in a specific direction (see, FIG. 5C and FIG. 5D), during charging/discharging.

Comparative Example 2

An electrode was prepared in the same way as in Example 1, except that the core was formed by pulverizing and classifying scaly natural graphite to obtain primary particles having a particle size of 7 μm, forming secondary particles with solid pitch to obtain secondary particles having a particle size of 15 μm and carrying out heat treatment at 3,000° C.

Comparative Example 3

An electrode was prepared in the same way as in Example 1, except that the core was formed by pulverizing and classifying scaly natural graphite to obtain primary particles having a particle size of 2 μm, forming secondary particles with solid pitch to obtain secondary particles having a particle size of 15 μm and carrying out heat treatment at 3,000° C. without TiO$_2$ coating.

Figure 6:
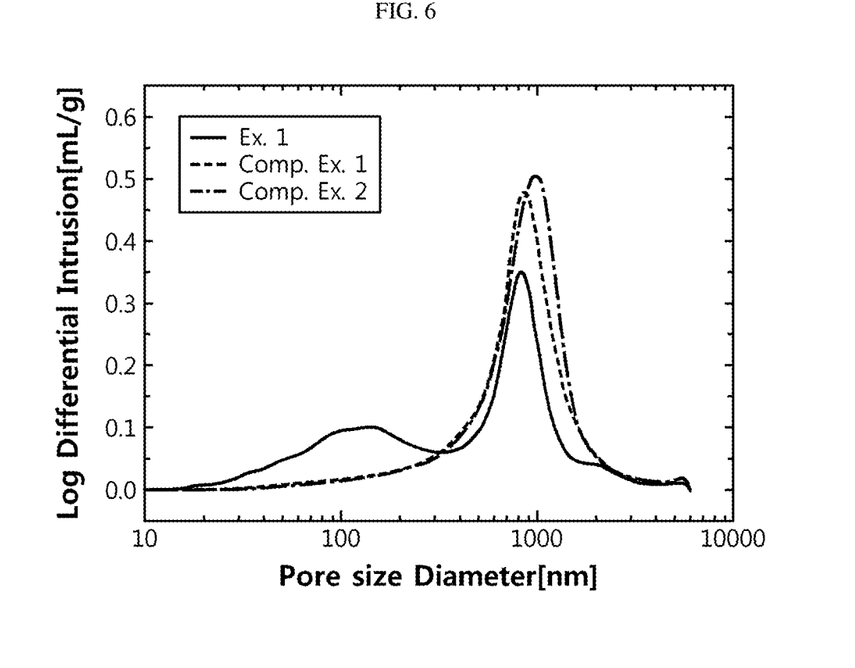
FIG. 6 is a graph illustrating the pore distribution of each of the electrodes according to Example and Comparative Examples.

FIG. 6 shows the results of porosity determined by a mercury porosimetry of each of the active materials according to Example and Comparative Examples. In the case of pores developed at 1 μm correspond to those formed between one particle and another particle, and appear commonly in each of the electrodes (negative electrodes) according to Example 1 and Comparative Examples 1 and 2. However, contrary to Comparative Examples, Example show porosity developed in a range of 100-300 nm. As can be seen from FIG. 4A and FIG. 4B, this suggests that pores capable of cushioning swelling in the particles are formed effectively.

Determination of Cycle Characteristics

Each of the batteries according to Example and Comparative Examples was determined for cycle characteristics. Each battery was charged to 4.8V at 0.1 C and discharged to 2.5V at 0.1 C for the 1$^{st}$ cycle, and charged to 4.5V at 0.2 C and discharged to 2.5V at 0.2 C in a constant-current (CC) mode for the 2$^{nd}$ cycle. Then, under the same current and voltage range as the 2$^{nd}$ cycle, charging and discharging were repeated 50 times in a CC mode. The following Table 1 shows the capacity maintenance and resistance increment. The capacity maintenance is calculated from the following Formula 1.

$$\text{Capacity maintenance (\%)} = [\text{Cycle discharge capacity at the } 50^{th} \text{ cycle/Cycle discharge capacity at the } 2^{nd} \text{ cycle}] \times 100 \quad [\text{Formula 1}]$$

Table 1 also shows the data of life characteristics for each of the batteries according to Example and Comparative Examples.

TABLE 1

|  | Ex. 1 | Comp. Ex. 1 | Comp. Ex. 2 | Comp. Ex. 3 |
| --- | --- | --- | --- | --- |
| Capacity maintenance (%) | 82% | 33% | 45% | 76% |

The battery according to Example shows a higher capacity maintenance as compared to Comparative Examples. This demonstrates that the electrode active material according to Example has a lower swelling ratio as compared to Comparative Examples and shows isotropic swelling.

The invention claimed is:

1. A negative electrode active material for a solid state battery which comprises a core portion comprising a carbonaceous material and a shell portion at least partially coated on a surface of the core portion,
   wherein the carbonaceous material comprises a plurality of pores, which have a porosity of 5-30 vol %, and a pore size of 100-300 nm based on the largest diameter of the pores, and the carbonaceous material comprises at least one of primary particles or secondary particles formed by aggregation of the primary particles, and the primary particles have a diameter (D50) of 500 nm to 5 μm, and
   the shell portion comprises a metal oxide, and the metal oxide is at least one selected from the group consisting of iron oxides, titanium oxide, aluminum oxide, chromium trioxide, zinc oxide, copper oxides, magnesium oxide, zirconium dioxide, molybdenum trioxide, vanadium pentoxide, niobium pentoxide, iron oxide, manganese oxide, vanadium oxide, cobalt oxide, nickel oxide and tantalum pentoxide.

2. The negative electrode active material for a solid state battery according to claim 1, wherein the carbonaceous material is at least one selected from the group consisting of soft carbon, hard carbon, natural graphite, kish graphite, pyrolytic carbon, mesophase pitch based carbon fibers, mesocarbon microbeads, mesophase pitches, petroleum or coal tar pitch derived cokes and activated carbon.

3. The negative electrode active material for a solid state battery according to claim 1, wherein the carbonaceous material is at least one selected from the group consisting of graphite primary particles, graphite secondary particles formed by aggregation of a plurality of graphite primary particles, and porous activated carbon.

4. The negative electrode active material for a solid state battery according to claim 1, wherein the pores comprise at least one selected from the group consisting of an open pore by which the inner part and the outer part of the active material are interconnected, and a closed pore.

5. The negative electrode active material for a solid state battery according to claim 1, wherein the core portion has a diameter ($D_{50}$) of 5-20 μm.

6. The negative electrode active material for a solid state battery according to claim 1, wherein the sectional area of the pores in the sectional area of the core of a portion of 50%±20% based on the largest diameter is 10-50% based on 100% of the sectional area of the cores.

7. The negative electrode active material for a solid state battery according to claim 1, wherein the shell portion has a thickness of 100 nm to 5 μm and covers 80% or more of the surface area of the core portion.

8. A negative electrode for a solid state battery, comprising an electrode active material layer comprising a negative electrode active material, a solid electrolyte and a conductive material, wherein the negative electrode active material is defined in claim 1.

9. The negative electrode for a solid state battery according to claim 8, wherein the solid electrolyte comprises at least one of a polymer electrolyte and an inorganic solid electrolyte.

10. A solid state battery comprising a negative electrode, a positive electrode and a solid electrolyte membrane interposed between the negative electrode and the positive electrode, wherein the negative electrode is defined in claim 8.

11. The negative electrode active material for a solid state battery according to claim 1, wherein the secondary particles have a diameter ($D_{50}$) of 5-20 μm.

12. The negative electrode active material for a solid state battery according to claim 1, wherein the shell portion comprises a conductive material in an amount of 0.1-10 wt % based on 100 wt % of the shell portion.

13. The negative electrode for a solid state battery according to claim 8, which has a porosity of 25-35 vol %.

* * * * *